United States Patent [19]

Peppers et al.

[11] Patent Number: 4,817,169
[45] Date of Patent: Mar. 28, 1989

[54] PAGE SEGMENTOR

[75] Inventors: Norman A. Peppers, Belmont; James R. Young, Palo Alto, both of Calif.; Hisami Nishi; Hiroshi Ueno, both of Osaka, Japan

[73] Assignee: Nippon Sheet Glass Co., Ltd., Osaka, Japan

[21] Appl. No.: 38,631

[22] Filed: Apr. 14, 1987

[51] Int. Cl.$^4$ .............................................. G06K 9/34
[52] U.S. Cl. ........................................ 382/9; 382/32; 382/45
[58] Field of Search ................... 382/9, 32, 44, 45, 35; 356/394

[56] References Cited

U.S. PATENT DOCUMENTS

| | | | |
|---|---|---|---|
| 3,160,853 | 12/1964 | Gregory | 340/146.3 |
| 3,219,974 | 11/1965 | Rabinow | 382/9 |
| 3,244,889 | 4/1966 | Preston et al. | 250/211 |
| 3,252,140 | 5/1966 | Lemay | 382/35 |
| 3,461,301 | 8/1969 | Fitzmaurice et al. | 250/219 |
| 3,550,119 | 12/1970 | Rabinow | 382/32 |
| 3,696,393 | 10/1972 | McDonald | 340/324 R |
| 3,965,299 | 6/1976 | Lin | 178/7.3 D |
| 4,204,193 | 5/1980 | Schroeder | 382/45 |
| 4,286,146 | 8/1981 | Uno et al. | 235/456 |
| 4,338,588 | 7/1982 | Chevillat et al. | 340/146.3 H |
| 4,441,205 | 4/1984 | Berkin et al. | 382/8 |
| 4,490,851 | 12/1984 | Gerhart et al. | 382/43 |
| 4,516,265 | 5/1985 | Kizu et al. | 382/9 |
| 4,527,283 | 7/1985 | Ito et al. | 382/9 |
| 4,573,198 | 2/1986 | Anderson | 382/31 |
| 4,654,873 | 3/1987 | Fujisawa et al. | 382/9 |
| 4,669,054 | 5/1987 | Schlunt et al. | 364/822 |
| 4,680,803 | 7/1987 | Dilella | 382/9 |
| 4,731,857 | 3/1988 | Tappert | 382/9 |

OTHER PUBLICATIONS

Character Reader, vol. 14, No. 9, Feb. 1972, IBM Technical Disclosure Bulletin, P. M. Hirsch, J. A. Jordan, Jr., and L. B. Lesem.

Bubble Domain Electronic-to-Optical Image transducer, IBM Technical Disclosure Bulletin, R. M. Craig, J. W. Crowe, and M. L. Dakss.

Nevatia, R., "Image Segmentation", *Handbook of Pattern Recognition and Image Processing*, Young et al., (ed.), Academic Press, Inc., New York, 1986, pp. 215-231.

*Primary Examiner*—Leo H. Boudreau
*Assistant Examiner*—Donald J. Daley
*Attorney, Agent, or Firm*—Woodcock Washburn Kurtz Mackiewicz & Norris

[57] ABSTRACT

In a page segmentor for dividing a page into areas each having a single feature, the division being performed as preprocessing for pattern recognition, one of the areas within the page is multiplied into multiple images, a feature of each area is extracted according to the presence or absence of each of pairs between the multiple images and a plurality of different masks, and the page is divided into areas until each area has a single feature. High-speed page segmentation can be achieved so as to obtain a desired feature.

3 Claims, 2 Drawing Sheets

PAGE SEGMENTOR

BACKGROUND OF THE INVENTION

1. Field of the Invention

The present invention relates to a page segmentor for dividing a document page into areas each having a single feature, the division being performed as preprocessing for pattern recognition.

2. Description of the Prior Art Conventional page segmentors are known wherein a page is divided into areas each having character strings written in one direction, such as a laterally (i.e., character strings across the page) or vertically (i.e., character strings written down the page, as in a Japanese document) written document.

In such a page segmentor, a page is divided into predetermined areas, and character strings within each area are scanned. In this case, an accumulated value of information representing the number of character portions and an accumulated value of information representing the number of noncharacter portions are calculated. The direction of the character string is discriminated according to the presence or absence of a position where the accumulated value changes. The dividing method may be corrected, or the divided areas may be merged to obtain areas consisting of only character strings of one direction.

In a conventional page segmentor of this type, pages including figures and tables cannot be classified because it is difficult to discriminate, e.g., a bar graph from a vertically written character string.

When a character string is inclined with respect to the standard direction, the scanning direction is corrected to a direction along the inclination direction of the character string, or the inclination direction is calculated according to the accumulated values. Therefore, page segmentation requires a long period of time.

In addition, the character string is scanned time-serially, which results in a longer page segmentation time.

SUMMARY OF THE INVENTION

A page segmentor according to the present invention comprises dividing means for dividing an area within a page into a plurality of areas, multiplying means for multiplying one of the plurality of areas into a plurality of images, and feature extracting means for extracting features of the area by optically detecting the presence or absence of a correlation between each of pairs of the plurality of images and a plurality of different masks, wherein the area within the page is divided into areas until each of the areas has a single feature.

In the page segmentor according to the present invention, one of the areas within the page is multiplied into a plurality of images, and different features are respectively extracted from the multiple images. Therefore, a plurality of features can be simultaneously extracted.

In addition, the feature of the area is extracted by optically detecting the presence or absence of a correlation between the multiple images and the corresponding mask. Therefore, a feature corresponding to the shape of the mask can be extracted.

In the page segmentor according to the present invention, a plurality of features can be simultaneously extracted, and thus page segmentation can be performed at high speed.

Furthermore, since a feature can be extracted so as to correspond to the shape of the mask, page segmentation can be achieved so as to obtain a desired feature by using a desired mask.

DETAILED DESCRIPTION OF THE PREFERRED EMBODIMENT

A preferred embodiment of the present invention will be described in detail with reference to FIGS. 1 to 4.

Figure 1:
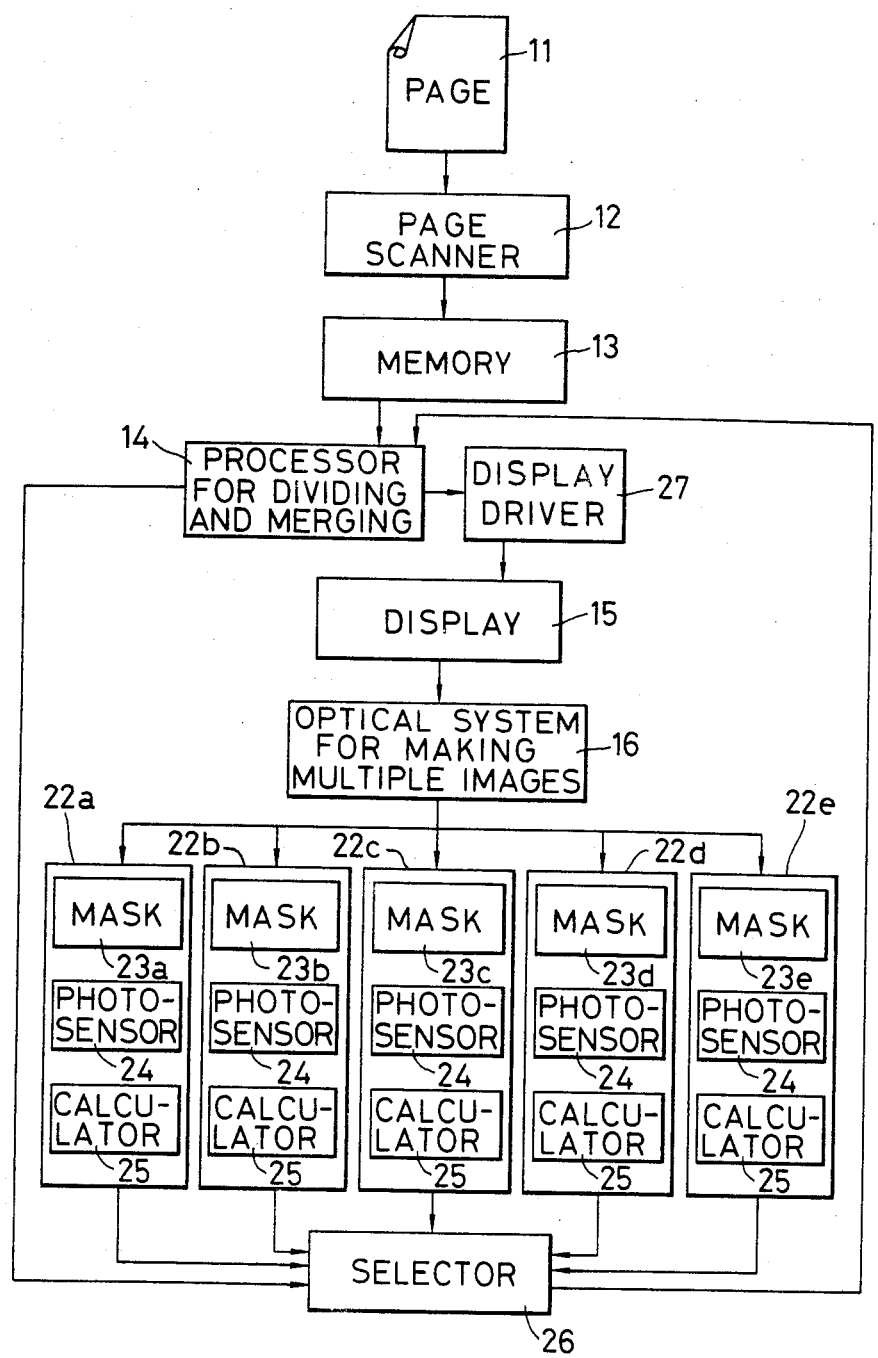
FIG. 1 is a block diagram of a page segmentor according to an embodiment of the present invention.

FIG. 1 shows the overall arrangement of the page segmentor. In this embodiment, a page 11 of a document is scanned by a page scanner 12, and the read page 11 is recorded in a memory 13.

The page scanner 12 need not have a resolution high enough to discriminate the shape of characters constituting the document, but can have a resolution enough to discriminate the presence or absence of characters.

The page 11 recorded in the memory 13 is divided into, e.g., four areas of first to fourth quadrants by a processor 14 for dividing and merging. One of the divided areas is transferred from a display driver 27 to a display 15 and is displayed on the display 15.

Figure 2:
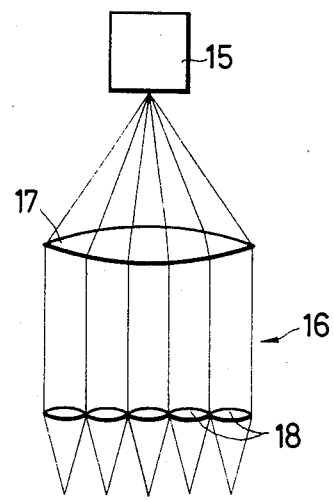
FIG. 2 is a side view of an optical system for making multiple images.

An output from the display 15 is input to an optical system 16 for making multiple images. The optical system 16 comprises, e.g., a single convex lens 17 having a relatively large aperture size and a plurality of convex lenses 18 each having a relatively small aperture size, as shown in FIG. 2.

The display 15 is located at a focal point of the convex lens 17 on the side opposite to the convex lenses 18. Images 21 (FIG. 3) of the area within the page 11 are formed at focal points of the convex lenses 18 on the side opposite to the convex lens 17. The number of images 21 is the number of convex lenses 18.

In this embodiment, the multiple images 21 are simultaneously input to five correlation calculators 22a to 22e. Each of the correlation calculators 22a to 22e comprises a corresponding one of masks 23a to 23e, a photosensor 24, and a calculator 25. The correlation calculators 22a to 22e are simultaneously operated.

Figure 3:
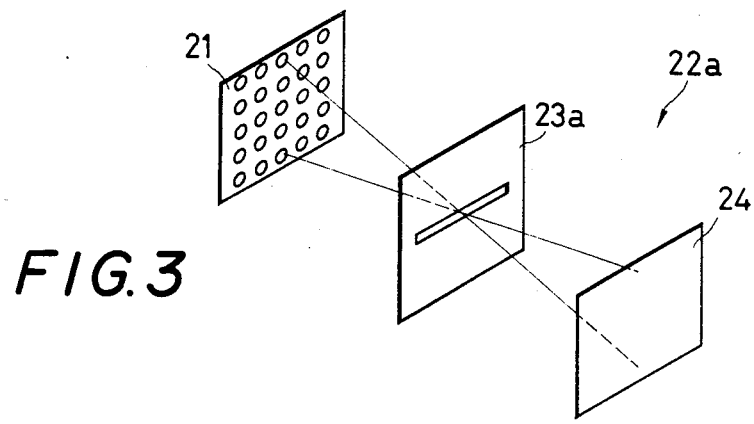
FIG. 3 is a schematic perspective view of a correlation calculator.
Figure 4A:
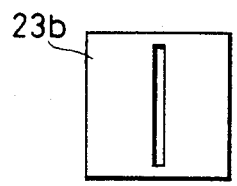
FIGS. 4A and 4B are front views of masks.
Figure 4B:
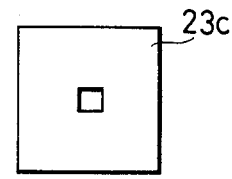

The masks 23a and 23b are masks for detecting laterally and vertically written documents, respectively, as shown in FIGS. 3 and 4A. The mask 23c is a mask corresponding to an expected character size, as shown in FIG. 4B. The masks 23d and 23e are masks corresponding to character sizes different from that of the mask 23c.

If a document as a multiple image 21 consists of vertically written characters, the calculator 25 in the correlation calculator 22b outputs a signal representing the presence of a correlation. In addition, in cooperation with the correlation calculators 22c to 22e, the vertically written characters are discriminated from a bar graph.

Information such as coordinates of the divided areas is transferred from the processor 14 for dividing and merging to a selector 26. The selector 26 discriminates the divided area and its feature on the basis of the transferred information and output signals from the correlation calculators 22a to 22e.

If one area has a plurality of features, e.g., vertically and laterally written characters, the processor 14 for dividing and merging performs division of the area again as instructed by the selector 26. By repeating the above operation, the page 11 is repeatedly divided until one area has a single feature.

The single feature assigned to each area and its coordinates are discriminated by the above operations. Finally, the areas having the same feature are merged by the processor 14 for dividing and merging.

Instead of the masks 23a to 23c shown in FIGS. 3 and 4, a large number of masks having slits inclined at any angles may be used to discriminate an inclined character string or an inclined line of characters.

By using masks having shapes corresponding to any figures or tables, such figures or tables can be discriminated from other matter on the document page.

What is claimed is:

1. A page segmentor comprising:
   dividing means for dividing a page into a plurality of areas,
   multiplying means for multiplying an image of one of the plurality of areas into a plurality of identical, smaller images, said multiplying means including a single convex lens having a relatively large aperture size, the image of the area being located at a focal point of said single convex lens, and a plurality of convex lenses each having a relatively small aperture size, said plurality of convex lenses being aligned on a side of said single convex lens opposite the image of the area in a direction perpendicular to an optical axis of said single convex lens in an optical path of light passing from the image of the area through said single convex lens,
   feature extracting means for simultaneously extracting features of the area by optically detecting the presence or absence of a correlation between each of pairs of the plurality of smaller images and a plurality of different masks, said plurality of masks including at least one mask for detecting a laterally written document having character strings written horizontally across the page, and at least one other mask for detecting a vertically written document having character strings written up or down the page, and
   merging means for merging two or more of the areas which have identical single features,
   wherein the page is further divided by the dividing means into progressively smaller areas until each of the areas has a single feature.

2. A segmentor according to claim 1, wherein said plurality of masks further include a mask having slits inclined at a given angle.

3. A segmentor according to claim 2, wherein said plurality of masks further include a mask having a shape corresponding to the shape of a given figure or a given table.

* * * * *